United States Patent
Kuwayama et al.

(10) Patent No.: US 10,207,542 B2
(45) Date of Patent: *Feb. 19, 2019

(54) PNEUMATIC RADIAL TIRE FOR PASSENGER VEHICLE

(71) Applicant: BRIDGESTONE CORPORATION, Chuo-ku, Tokyo (JP)

(72) Inventors: Isao Kuwayama, Kodaira (JP); Hiroyuki Matsumoto, Kodaira (JP); Shintaro Hatanaka, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/355,597

(22) PCT Filed: Nov. 2, 2012

(86) PCT No.: PCT/JP2012/007043
§ 371 (c)(1),
(2) Date: May 1, 2014

(87) PCT Pub. No.: WO2013/065318
PCT Pub. Date: May 10, 2013

(65) Prior Publication Data
US 2014/0290819 A1    Oct. 2, 2014

(30) Foreign Application Priority Data
Nov. 2, 2011    (JP) .................. 2011-241581

(51) Int. Cl.
*B60C 3/04*     (2006.01)
*B60C 9/22*     (2006.01)

(52) U.S. Cl.
CPC .................. *B60C 3/04* (2013.01); *B60C 9/22* (2013.01); *B60C 2009/2223* (2013.01);
(Continued)

(58) Field of Classification Search
CPC ............ B60C 9/22; B60C 9/2204; B60C 9/18; B60C 9/20; B60C 3/04; B60C 2009/2271;
(Continued)

(56) References Cited

U.S. PATENT DOCUMENTS 3,628,587 A * 12/1971 O'Neil .................. B60C 9/2006
152/527
3,786,851 A     1/1974 Mirtain et al.
(Continued)

FOREIGN PATENT DOCUMENTS

BG        61716 B1     4/1998
EP      0370699 A2     5/1990
(Continued)

OTHER PUBLICATIONS

600R16 Coker Classic Blackwall Tire as accessed on the Internet Archive at http://web.archive.org/web/20081004230735/http://store.coker.com/600r16-coker-classic-blackwall-tire.html showing the page as of Oct. 4, 2008.*
(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

An object of the present invention is to adequately control relationship between a cross sectional width SW and an outer diameter OD of a pneumatic radial tire for a passenger vehicle. The tire is further characterized in that, provided that each half portion in the tire width direction of a ground contact surface of the tire is divided in the tire width direction into three equal portions including a tire-width-direction center portion, a tire-width-direction intermediate portion and a tire-width-direction outer portion from the tire-width-direction center side, rigidity in the tire circumferential direction of the belt reinforcing layer in a region in
(Continued)

the tire width direction thereof corresponding to the tire-width-direction outer side portion is lower than rigidity in the tire circumferential direction of the belt reinforcing layer in a region in the tire width direction thereof corresponding to the tire-width-direction center portion.

22 Claims, 6 Drawing Sheets

(52) U.S. Cl.
CPC ............... *B60C 2009/2233* (2013.01); *B60C 2009/2261* (2013.01); *B60C 2009/2271* (2013.01); *B60C 2009/2295* (2013.01)

(58) Field of Classification Search
CPC .... B60C 2009/2266; B60C 2009/2261; B60C 2009/2276; B60C 2009/2295; B60C 2009/2252; B60C 2009/2228; B60C 2009/2233; B60C 2009/2223; B60C 2009/2214; B60C 2009/2019; B60C 2009/2022
USPC ................................................ 152/531, 454
See application file for complete search history.

(56) References Cited

U.S. PATENT DOCUMENTS

| 4,385,653 | A | * | 5/1983 | Okazaki | ............... B60C 11/00 152/209.5 |
|---|---|---|---|---|---|
| 5,882,450 | A | | 3/1999 | Benchea | |
| 6,481,479 | B1 | | 11/2002 | Weed et al. | |

FOREIGN PATENT DOCUMENTS

| FR | 2719525 A1 | 11/1995 |
|---|---|---|
| JP | 53040903 A | 4/1978 |
| JP | 61-275005 A | 12/1986 |
| JP | 3-213404 A | 9/1991 |
| JP | 7-40706 A | 2/1995 |
| JP | 2544556 B2 | 10/1996 |
| JP | 10309906 A | 11/1998 |
| JP | 2000-190706 A | 7/2000 |
| JP | 2008-296864 A | 12/2008 |
| JP | 2010-47191 A | 3/2010 |
| JP | 2010-137819 A | 6/2010 |

OTHER PUBLICATIONS

Coker Classic Radial 600R16—Blackwall Tire as accessed at http://www.tiresandwires.com/Coker-Classic-Radial-600R16--Blackwall-Tire_p_69.html on Jan. 11, 2015.*
Machine translation of JP2010-137819 (no date).*
Machine translation of JP2008-296864 (no date).*
Machine translation of JP2000-190706 (no date).*
Machine translation of JP03-213404 (no date).*
Spare tyre wheel T165/70D16 Toyota Celica ZZ T23 Coupe 1.8 16V Vt-i Yr 99-02 as accessed from http://www.ebay.com/itm/Spare-tyre-wheel-T165-70D16-Toyota-Celica-ZZ-T23-Coupe-1-8-16V-VT-i-Yr-99-02-/381718694058 on Aug. 17, 2017.*
Honda Insight (2010 Honda Insight 175/65-15 as accessed from https://www.tirerack.com/tires/SelectTireSize.jsp?autoMake=Honda&autoModel=Insight&autoYear=2010&autoModClar=LX on Apr. 1, 2018).*
International Search Report of PCT/JP2012/007043 dated Feb. 5, 2013.
Communication dated Jul. 16, 2015 from the European Patent Office in counterpart application No. 12846418.7.
Communication dated Sep. 30, 2015 from the State Intellectual Property Office of the People's Republic of China in counterpart application No. 201280061454.9.
Non Final Office Action dated Jun. 7, 2017 issue in U.S. Appl. No. 14/355,738.

* cited by examiner

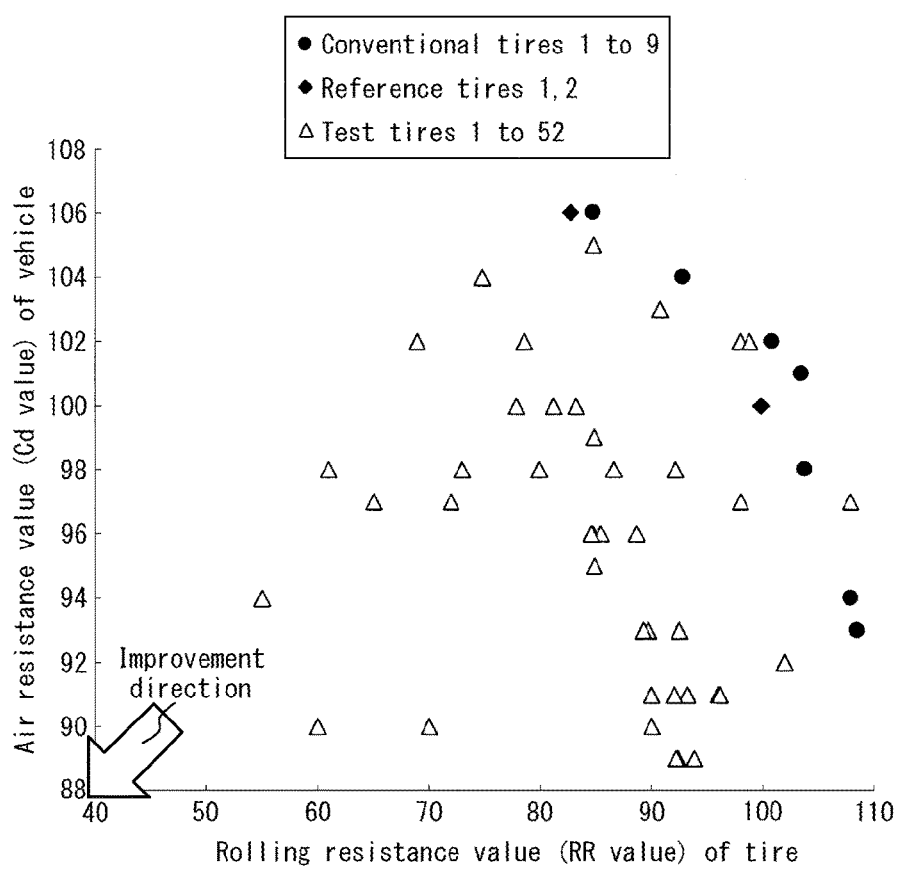

PNEUMATIC RADIAL TIRE FOR PASSENGER VEHICLE

CROSS REFERENCE TO RELATED APPLICATIONS

This application is a National Stage of International Application No. PCT/JP2012/007043, filed on Nov. 2, 2012, which claims priority from Japanese Patent Application No. 2011-241581, filed on Nov. 2, 2011, the contents of all of which are incorporated herein by reference in their entirety.

TECHNICAL FIELD

The present invention relates to a pneumatic radial tire for a passenger vehicle.

BACKGROUND ART

Bias tires having relatively narrow cross sectional widths were predominantly used in vehicles up to around 1960 because vehicles in those days were relatively lightweight, had relatively low cruising speed required thereof and thus did not put so much stress on the tires. However, radial tires having wide and flat structures are predominant these days because good driving stability in high speed running, as well as good wear resistance, is required of tires as highway networks are developed and vehicle speed increases (e.g. PTL 1).

However, increasing widths of tires decreases free space in a vehicle and deteriorates comfortablility therein. This is becoming a big issue because electric vehicles which have been developed for use in recent years, in particular, must have sufficient space for accommodating driving units such as a motor for controlling torque of rotating tires around drive shafts and in this regard ensuring sufficient space in vicinities of tires thereof is increasingly important.

Further, there has been increasingly a demand for a better fuel efficiency in recent years as people are more concerned about environmental issues. It has been conventionally known that increasing diameter and width of a tire is effective in terms of decreasing rolling resistance value (RR value) of the tire for better fuel efficiency thereof. Increasing diameter and width of a tire, however, also increases weight of the tire and air resistance of a vehicle, thereby resulting in an increase in resistance experienced by the vehicle and too much load on the tire.

Moreover, increasing diameter of a tire increases belt tension, enhances ring rigidity of the tire and thus makes the tire sensitive to an input of force from a road surface, thereby causing another problem of deteriorated low-noise properties of the tire.

CITATION LIST

Patent Literature

PTL 1: JP-A 07-040706

SUMMARY OF THE INVENTION

Technical Problems

The present invention aims at solving the problems described above and an object thereof is to provide a pneumatic radial tire for a passenger vehicle where low-noise properties of the tire have been improved with ensuring high fuel efficiency and wide free space in a vehicle.

Solution to the Problems

The inventors of the present invention keenly studied to solve the problems described above.
As a result, the inventors first discovered that reducing a tire width and increasing a tire diameter or, more specifically, controlling a cross sectional width SW and an outer diameter OD of a radial tire under an appropriate SW-OD relationship is very effective in terms of ensuring good fuel efficiency and wide free space of a vehicle using the radial tire.
Further, the inventors newly discovered that it is effective in a radial tire having small width and large diameter to appropriately control distribution, in the tire width direction, of rigidity in the circumferential direction of a belt reinforcing layer in terms of improving low-noise properties of the tire.

The present invention has been contrived based on the aforementioned discoveries and main structural features are as follows.
(1) A pneumatic radial tire for a passenger vehicle, having a carcass constituted of plies as radially-disposed carcass cords and provided in a toroidal shape across a pair of bead portions, a belt constituted of one or two belt layers, and at least one belt reinforcing layer as a rubber-coated cord layer extending in the tire circumferential direction, the belt and the belt reinforcing layer being provided on the outer side in the tire radial direction of the carcass, characterized in that:
provided that SW and OD represent cross sectional width and outer diameter of the tire, respectively, SW/OD≤0.26 when SW<165 (mm) and
SW and OD satisfy a formula shown below when SW≥165 (mm)

$$OD \geq 2.135 \times SW + 282.3; \text{ and}$$

provided that each half portion in the tire width direction of a ground contact surface of the tire is divided in the tire width direction into three equal portions including a tire-width-direction center portion, a tire-width-direction intermediate portion and a tire-width-direction outer portion from the tire-width-direction center side, rigidity in the tire circumferential direction of the belt reinforcing layer in a region in the tire width direction thereof corresponding to the tire-width-direction outer side portion is lower than rigidity in the tire circumferential direction of the belt reinforcing layer in a region in the tire width direction thereof corresponding to the tire-width-direction center portion.

In the present invention, a "ground contact surface" of a tire represents a tread surface of the tire in contact with a road surface when the tire is assembled with a rim and inflated at the air pressure under the maximum load respectively prescribed for each vehicle on which the tire is to be mounted. "The maximum load prescribed for each vehicle" represents the largest load value among respective four load values exerted on four tires of the vehicle when the prescribed upper limit number of occupants ride in the vehicle. Further, rigidity X in the tire circumferential direction of a region of the belt reinforcing layer is defined by the following formula, wherein Y represents Young's modulus (GPa) of cords of the region of the belt reinforcing layer, n represents a cord implantation number (number of cords/50 mm) of the region, W represents a width (mm) in the tire width direction of the region, and m represents the number of layers constituting the belt reinforcing layer in the region.

$$X = Y \times n \times W \times m$$

The cord implantation number of the belt reinforcing layer in a region in the tire width direction thereof corresponding to the tire-width-direction center portion is to be calculated as the average cord implantation number over the region in the tire width direction. The cord implantation number of the belt reinforcing layer in a region in the tire width direction thereof corresponding to the tire-width-direction outer portion is to be calculated in the same manner in this connection.

(2) A pneumatic radial tire for a passenger vehicle, having a carcass constituted of plies as radially-disposed carcass cords and provided in a toroidal shape across a pair of bead portions, a belt constituted of one or two belt layers, and at least one belt reinforcing layer as a rubber-coated cord layer extending in the tire circumferential direction, the belt and the belt reinforcing layer being provided on the outer side in the tire radial direction of the carcass, characterized in that:

provided that SW and OD represent cross sectional width and outer diameter of the tire, respectively, SW and OD satisfy a formula shown below $$OD \geq -0.0187 \times SW^2 + 9.15 \times SW - 380; \text{ and}$$

provided that each half portion in the tire width direction of a ground contact surface of the tire is divided into three equal portions including a tire-width-direction center portion, a tire-width-direction intermediate portion and a tire-width-direction outer portion from the tire-width-direction center side, rigidity in the tire circumferential direction of the belt reinforcing layer in a region in the tire width direction thereof corresponding to the tire-width-direction outer side portion is lower than rigidity in the tire circumferential direction of the belt reinforcing layer in a region in the tire width direction thereof corresponding to the tire-width-direction center portion.

Advantageous Effect of the Invention

According to the present invention, it is possible to provide a pneumatic radial tire for a passenger vehicle having excellent low-noise properties with ensuring high fuel efficiency of and wide free space in a vehicle.

BRIEF DESCRIPTION OF THE DRAWINGS

FIG. 5 is a graph showing a relationship between rolling resistance value and air resistance value in each of the test tires.

DESCRIPTION OF THE EMBODIMENTS

Figure 1:
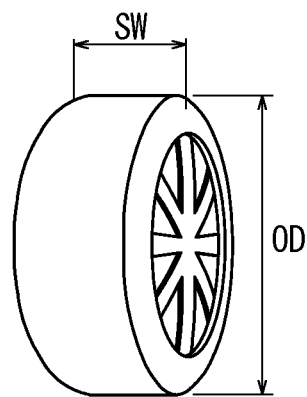
FIG. 1 is a view showing a cross sectional width SW and an outer diameter OD of a tire.

How a pneumatic radial tire for a passenger vehicle of the present invention (which tire will be referred to simply as a "tire" hereinafter) has been realized will be described below. First, the inventors of the present invention paid attention to a fact that a tire cross sectional width SW (see FIG. 1) of a radial tire smaller than that of the conventional radial tire ensures a wide free space in a vehicle, a wide space for accommodating a driving member in vicinities on the vehicle-inner side of the tire in particular (see FIGS. 2A and 2B).

A tire cross sectional width SW of a radial tire smaller than that of the conventional radial tire also causes a good effect of reducing an air resistance value (Cd value) of the vehicle because an area of the tire viewed from the front thereof decreases.

However, there is a demerit in this case in that a rolling resistance value (RR value) of the tire increases due to an increase in magnitude of deformation of a ground contact portion of a tread when the internal air pressure of the tire remains the same.

Figures 2A, 2B:
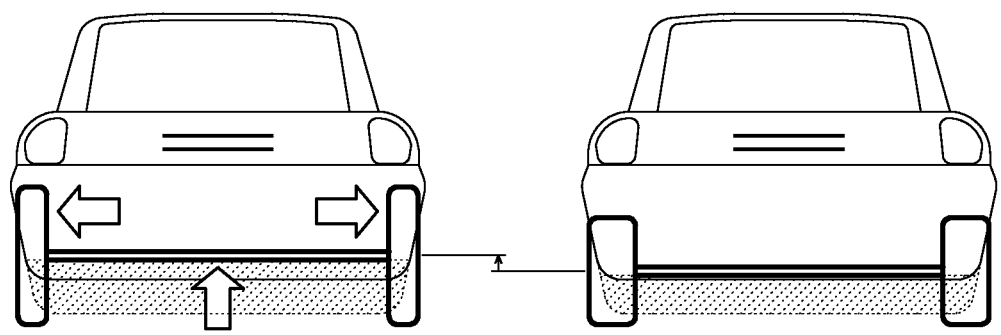
FIG. 2A is a view showing a vehicle having the tires of the present invention with large diameters and narrow widths mounted thereon.
FIG. 2B is a view showing a vehicle having the conventional tires mounted thereon.

The inventors of the present invention, in view of the aforementioned situation, discovered that the problem can be solved by utilizing the characteristics inherent to a radial tire. Specifically, the inventors of the present invention realized that, in the case of a radial tire having a smaller magnitude of tread deformation than a bias tire, it is possible to make the radial tire be less affected by a rough road surface and thus reduce a rolling resistance value (RR value) thereof when the internal air pressure remains the same by increasing the outer diameter OD (see FIG. 1) of the radial tire as compared with the conventional radial tire. Further, the inventors of the present invention also realized that an increase in outer diameter OD of a radial tire enhances the loading capacity of the tire. Yet further, an increase in outer diameter of a radial tire increases height of drive shafts to enlarge an under-chassis space, as shown in FIG. 2A, thereby allowing the vehicle to keep wide spaces for a car boot, driving units and the like.

In short, reducing width and increasing outer diameter of a tire effectively ensure a wide space in a vehicle, respectively, although they are in a trade-off relationship in terms of a rolling resistance value (RR value). Reducing tire width also successfully decreases an air resistance value (Cd value) of a vehicle.

In view of this, the inventors of the present invention keenly studied optimizing a relationship between a tire cross sectional width and an outer diameter of a tire such that an air resistance value (Cd value) and a rolling resistance value (RR value) of a vehicle improve as compared with the conventional radial tire.

Specifically, the inventors of the present invention, paying their attention to a relationship between a tire cross sectional width SW and an outer diameter OD of a tire, carried out a test including mounting test tires of various tire sizes (some of them were non-standard products) on a vehicle and measuring an air resistance value (Cd value) and a rolling resistance value (RR value) for each type or size of the test tires. A condition satisfied by SW and OD when both of an air resistance value and a rolling resistance value were superior to those of the conventional radial tire was empirically deduced based on the measurement results.

The experiment results from which the optimum relationship between SW and OD was obtained will be described in detail hereinafter.

Figure 3:
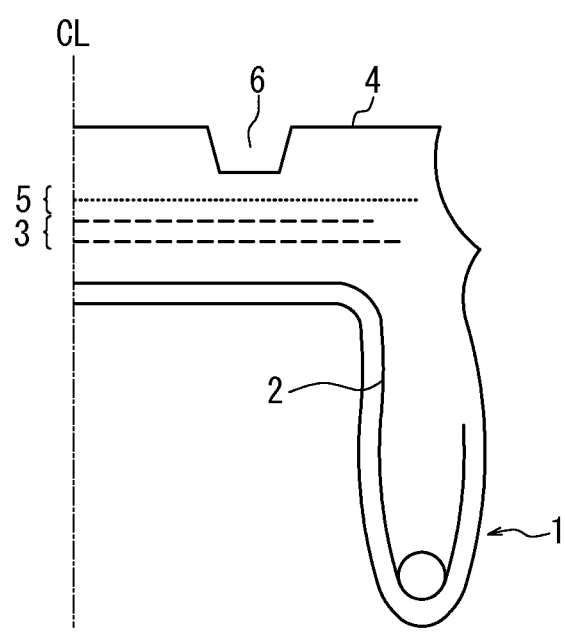
FIG. 3 is a schematic cross sectional view of a half portion of a radial tire used in a test in the present invention.

FIG. 3 is a schematic cross sectional view, in the tire width direction, of a tire used in the aforementioned test. FIG. 3 shows only one half portion with respect to the tire equatorial plane CL of the tire. The other half portion of the tire shares basically the same structure as the one half portion and therefore illustration thereof will be omitted.

FIG. 3 shows a tire in a state where the tire has been assembled with a rim and inflated at the air pressure under the maximum load respectively prescribed for each vehicle on which the tire is to be mounted.

A plurality of pneumatic radial tires for use in a passenger vehicle, each having a pair of bead portions 1 and a carcass 2 radially disposed to extend in a toroidal shape across the pair of bead portions 1 as shown in FIG. 3, were prepared as test tires of various tire sizes.

The tire exemplarily shown in FIG. 3 has the carcass 2 constituted of organic fibers, a belt 3 constituted of a plurality of belt layers (two belt layers in FIG. 3) and a tread 4 such that the belt 3 and the tread 4 are provided on the outer side in the tire radial direction of a crown portion of the carcass 2 in this order. The two belt layers shown in FIG. 3 are slant belt layers provided such that belt cords of one layer intersect belt cords of the other layer alternately and that the belt cords of each layer are inclined at an inclination angle in the range of ±20° to ±40° with respect to the tire equatorial plane CL. Further, the tire exemplarily shown in FIG. 3 has one belt reinforcing layer 5 as a rubber-coated cord layer in which cords are spirally wound along the tire equatorial plane to extend substantially in the tire circumferential direction such that the belt reinforcing layer 5 is disposed on the outer side in the tire radial direction of the belt layer 3. The belt reinforcing layer 5 shown in FIG. 3 includes cords made of nylon and having Young's modulus: 3.2 GPa and fineness: 1400 dtex such that the cords are implanted in the belt reinforcing layer at the cord implantation number of 50 (number of cords/50 mm).

"Young's modulus" represents Young's modulus in the tire circumferential direction to be determined by a test according to JIS L1017 8.5 a) (2002) and calculated according to JIS L1017 8.8 (2002) in the present invention.

A plurality of main grooves 6 each extending in the tire circumferential direction are formed in the tread 4 (one main groove in each half portion of the tire exemplarily shown in FIG. 3).

A number of test tires having various cross sectional widths and outer diameters were prepared based on the tire structures described above.

First, there was prepared as Reference tire 1 a tire having tire size: 195/65R15, which tire size is used in vehicles of the most common types and thus suitable for comparison of tire performances. There was also prepared as Reference tire 2 a tire having tire size: 225/45R17, which is what is called an "inch-up" version of Reference tire 1.

Further, there were also prepared other test tires (test tires 1 to 52 and conventional test tires 1 to 9) of various tire sizes. These test tires were each assembled with a rim, inflated at internal pressure of 220 kPa and subjected to the tests described below.

Table 1 shows relevant characteristics of the respective test tires.

With regard to tire sizes, a variety of tire sizes including the conventional sizes prescribed in JATMA (The Japan Automobile Tyre Manufacturers Association, Inc.) in Japan, TRA (THE TIRE and RIM ASSOCIATION INC.) in the United States, ETRTO (European Tyre and Rim Technical Organisation) in Europe and the like and those beyond these conventional sizes were widely studied.

TABLE 1-1

|  | Tire size | SW (mm) | OD (mm) | SW/OD |
|---|---|---|---|---|
| Conventional tire 1 | 145/70R12 | 145 | 507.8 | 0.29 |
| Conventional tire 2 | 155/55R14 | 155 | 526.1 | 0.29 |
| Conventional tire 3 | 165/60R14 | 165 | 553.6 | 0.30 |
| Conventional tire 4 | 175/65R14 | 175 | 583.1 | 0.30 |
| Conventional tire 5 | 185/60R15 | 185 | 603 | 0.31 |
| Conventional tire 6 | 205/55R16 | 205 | 631.9 | 0.32 |
| Conventional tire 7 | 215/60R16 | 215 | 664.4 | 0.32 |
| Conventional tire 8 | 225/55R17 | 225 | 679.3 | 0.33 |
| Conventional tire 9 | 245/45R18 | 245 | 677.7 | 0.36 |
| Reference tire 1 | 195/65R15 | 195 | 634.5 | 0.31 |
| Reference tire 2 | 225/45R17 | 225 | 634.3 | 0.35 |
| Test tire 1 | 155/55R21 | 155 | 704.5 | 0.22 |
| Test tire 2 | 165/55R21 | 165 | 717.4 | 0.23 |
| Test tire 3 | 155/55R19 | 155 | 653.1 | 0.24 |
| Test tire 4 | 155/70R17 | 155 | 645.8 | 0.24 |
| Test tire 5 | 165/55R20 | 165 | 689.5 | 0.24 |
| Test tire 6 | 165/65R19 | 165 | 697.1 | 0.24 |
| Test tire 7 | 165/70R18 | 165 | 687.5 | 0.24 |
| Test tire 8 | 165/55R16 | 165 | 589.3 | 0.28 |
| Test tire 9 | 175/65R15 | 175 | 625.0 | 0.28 |
| Test tire 10 | 185/60R17 | 185 | 660.7 | 0.28 |
| Test tire 11 | 195/65R17 | 195 | 696.4 | 0.28 |
| Test tire 12 | 205/60R18 | 205 | 732.1 | 0.28 |
| Test tire 13 | 185/50R16 | 185 | 596.8 | 0.31 |
| Test tire 14 | 205/60R16 | 205 | 661.3 | 0.31 |
| Test tire 15 | 215/60R17 | 215 | 693.5 | 0.31 |
| Test tire 16 | 225/65R17 | 225 | 725.8 | 0.31 |
| Test tire 17 | 155/45R21 | 155 | 672.9 | 0.23 |
| Test tire 18 | 205/55R16 | 205 | 631.9 | 0.32 |
| Test tire 19 | 165/65R19 | 165 | 697.1 | 0.24 |
| Test tire 20 | 155/65R18 | 155 | 658.7 | 0.24 |

TABLE 1-2

|  | Tire size | SW (mm) | OD (mm) | SW/OD |
|---|---|---|---|---|
| Test tire 21 | 145/65R19 | 145 | 671.1 | 0.22 |
| Test tire 22 | 135/65R19 | 135 | 658.1 | 0.21 |
| Test tire 23 | 125/65R19 | 125 | 645.1 | 0.19 |
| Test tire 24 | 175/55R22 | 175 | 751.3 | 0.23 |
| Test tire 25 | 165/55R20 | 165 | 689.5 | 0.24 |
| Test tire 26 | 155/55R19 | 155 | 653.1 | 0.24 |
| Test tire 27 | 145/55R20 | 145 | 667.5 | 0.22 |
| Test tire 28 | 135/55R20 | 135 | 656.5 | 0.21 |
| Test tire 29 | 125/55R20 | 125 | 645.5 | 0.19 |
| Test tire 30 | 175/45R23 | 175 | 741.7 | 0.24 |
| Test tire 31 | 165/45R22 | 165 | 707.3 | 0.23 |
| Test tire 32 | 155/45R21 | 155 | 672.9 | 0.23 |
| Test tire 33 | 145/45R21 | 145 | 663.9 | 0.22 |
| Test tire 34 | 135/45R21 | 135 | 654.9 | 0.21 |
| Test tire 35 | 145/60R16 | 145 | 580.4 | 0.25 |
| Test tire 36 | 155/60R17 | 155 | 617.8 | 0.25 |
| Test tire 37 | 165/55R19 | 165 | 664.1 | 0.25 |
| Test tire 38 | 155/45R18 | 155 | 596.7 | 0.26 |
| Test tire 39 | 165/55R18 | 165 | 638.7 | 0.26 |
| Test tire 40 | 175/55R19 | 175 | 675.1 | 0.26 |
| Test tire 41 | 115/50R17 | 115 | 546.8 | 0.21 |
| Test tire 42 | 105/50R16 | 105 | 511.4 | 0.21 |
| Test tire 43 | 135/60R17 | 135 | 593.8 | 0.23 |
| Test tire 44 | 185/60R20 | 185 | 730 | 0.25 |
| Test tire 45 | 185/50R20 | 185 | 693.0 | 0.27 |
| Test tire 46 | 195/60R19 | 195 | 716.6 | 0.27 |
| Test tire 47 | 175/60R18 | 175 | 667.2 | 0.26 |
| Test tire 48 | 195/55R20 | 195 | 722.5 | 0.27 |
| Test tire 49 | 215/50R21 | 215 | 748.4 | 0.29 |
| Test tire 50 | 205/55R20 | 205 | 733.5 | 0.28 |
| Test tire 51 | 185/45R22 | 185 | 716.3 | 0.26 |
| Test tire 52 | 155/65R13 | 155 | 634.3 | 0.29 |

<Rolling Resistance (RR Value)>
Rolling resistance was measured by: assembling each of the test tires described above with a rim to obtain a tire-rim assembly inflated at internal pressure as shown in Tables 2-1 and 2-2; excreting on the tire-rim assembly the maximum load prescribed for a vehicle on which the tire is mounted; and running the tire at drum rotation speed of 100 km/hour to measure a rolling resistance thereof.
The evaluation results are shown as index values relative to "100" of Reference tire 1.
The smaller index value represents the smaller rolling resistance.
<Air Resistance (Cd) Value of Vehicle>
Air resistance was determined by: assembling each of the test tires described above with a rim to obtain a tire-rim assembly inflated at internal pressure as shown in Tables 2-1 and 2-2; mounting the tire-rim assembly on a vehicle of 1500 cc displacement; and blasting air on the tire at speed corresponding to 100 km/hour and measuring an air pressure value experienced by the tire by a balance installed on the floor under the tire. The results were converted to index values relative to "100" of Reference tire 1 for evaluation. The smaller index value represents the smaller air resistance. The evaluation results are shown in Tables 2-1, 2-2 and FIGS. 4A, 4B.

TABLE 2-1

|  | Tire size | Internal pressure (kPa) | RR value (INDEX) | Cd value (INDEX) |
|---|---|---|---|---|
| Conventional tire 1 | 145/70R12 | 295 | 108 | 94 |
| Conventional tire 2 | 155/55R14 | 275 | 111.3 | 91 |
| Conventional tire 3 | 165/60R14 | 260 | 108.6 | 93 |
| Conventional tire 4 | 175/65R14 | 245 | 103.6 | 101 |
| Conventional tire 5 | 185/60R15 | 230 | 103.9 | 98 |
| Conventional tire 6 | 205/55R16 | 220 | 101 | 102 |
| Conventional tire 7 | 215/60R16 | 220 | 93 | 104 |
| Conventional tire 8 | 225/55R17 | 220 | 85 | 106 |
| Conventional tire 9 | 245/45R18 | 220 | 80 | 111 |
| Reference tire 1 | 195/65R15 | 220 | 100 | 100 |
| Reference tire 2 | 225/45R17 | 220 | 83 | 106 |
| Test tire 1 | 155/55R21 | 220 | 60 | 90 |
| Test tire 2 | 165/55R21 | 220 | 55 | 94 |
| Test tire 3 | 155/55R19 | 220 | 90 | 90 |
| Test tire 4 | 155/70R17 | 220 | 85 | 95 |
| Test tire 5 | 165/55R20 | 220 | 72 | 97 |
| Test tire 6 | 165/65R19 | 220 | 65 | 97 |
| Test tire 7 | 165/70R18 | 220 | 61 | 98 |
| Test tire 8 | 165/55R16 | 220 | 102 | 92 |
| Test tire 9 | 175/65R15 | 220 | 98 | 97 |
| Test tire 10 | 185/60R17 | 220 | 85 | 99 |
| Test tire 11 | 195/65R17 | 220 | 78 | 100 |
| Test tire 12 | 205/60R18 | 220 | 69 | 102 |
| Test tire 13 | 185/50R16 | 220 | 108 | 97 |
| Test tire 14 | 205/60R16 | 220 | 98 | 102 |
| Test tire 15 | 215/60R17 | 220 | 91 | 103 |
| Test tire 16 | 225/65R17 | 220 | 85 | 105 |
| Test tire 17 | 155/45R21 | 220 | 70 | 90 |
| Test tire 18 | 205/55R16 | 220 | 99 | 102 |
| Test tire 19 | 165/65R19 | 260 | 92.2 | 98 |
| Test tire 20 | 155/65R18 | 275 | 96 | 91 |

TABLE 2-2

|  | Tire size | Internal pressure (kPa) | RR value (INDEX) | Cd value (INDEX) |
|---|---|---|---|---|
| Test tire 21 | 145/65R19 | 295 | 92.4 | 89 |
| Test tire 22 | 135/65R19 | 315 | 91.6 | 87 |
| Test tire 23 | 125/65R19 | 340 | 88.2 | 85 |
| Test tire 24 | 175/55R22 | 345 | 84.8 | 96 |
| Test tire 25 | 165/55R20 | 260 | 92.6 | 93 |
| Test tire 26 | 155/55R19 | 275 | 96.2 | 91 |
| Test tire 27 | 145/55R20 | 290 | 92.3 | 89 |
| Test tire 28 | 135/55R20 | 310 | 92.4 | 87 |
| Test tire 29 | 125/55R20 | 340 | 87.7 | 85 |
| Test tire 30 | 175/45R23 | 250 | 85.5 | 96 |
| Test tire 31 | 165/45R22 | 255 | 89.7 | 93 |
| Test tire 32 | 155/45R21 | 270 | 93.2 | 91 |
| Test tire 33 | 145/45R21 | 290 | 92.2 | 89 |
| Test tire 34 | 135/45R21 | 310 | 92.1 | 87 |
| Test tire 35 | 145/60R16 | 290 | 93.9 | 89 |
| Test tire 36 | 155/60R17 | 270 | 92.1 | 91 |
| Test tire 37 | 165/55R19 | 255 | 89.4 | 93 |
| Test tire 38 | 155/45R18 | 270 | 92.1 | 91 |
| Test tire 39 | 165/55R18 | 255 | 89.4 | 93 |
| Test tire 40 | 175/55R19 | 250 | 88.7 | 96 |
| Test tire 41 | 115/50R17 | 350 | 86.7 | 83 |
| Test tire 42 | 105/50R16 | 350 | 94.1 | 80 |
| Test tire 43 | 135/60R17 | 300 | 85.6 | 87 |
| Test tire 44 | 185/60R20 | 270 | 73.0 | 98 |
| Test tire 45 | 185/50R20 | 270 | 80.0 | 98 |
| Test tire 46 | 195/60R19 | 258 | 81.3 | 100 |
| Test tire 47 | 175/60R18 | 286 | 84.7 | 96 |
| Test tire 48 | 195/55R20 | 277 | 83.3 | 100 |
| Test tire 49 | 215/50R21 | 250 | 75.0 | 104 |
| Test tire 50 | 205/55R20 | 263 | 78.7 | 102 |
| Test tire 51 | 185/45R22 | 285 | 86.7 | 98 |
| Test tire 52 | 155/65R13 | 220 | 90 | 91 |

Figure 4A:
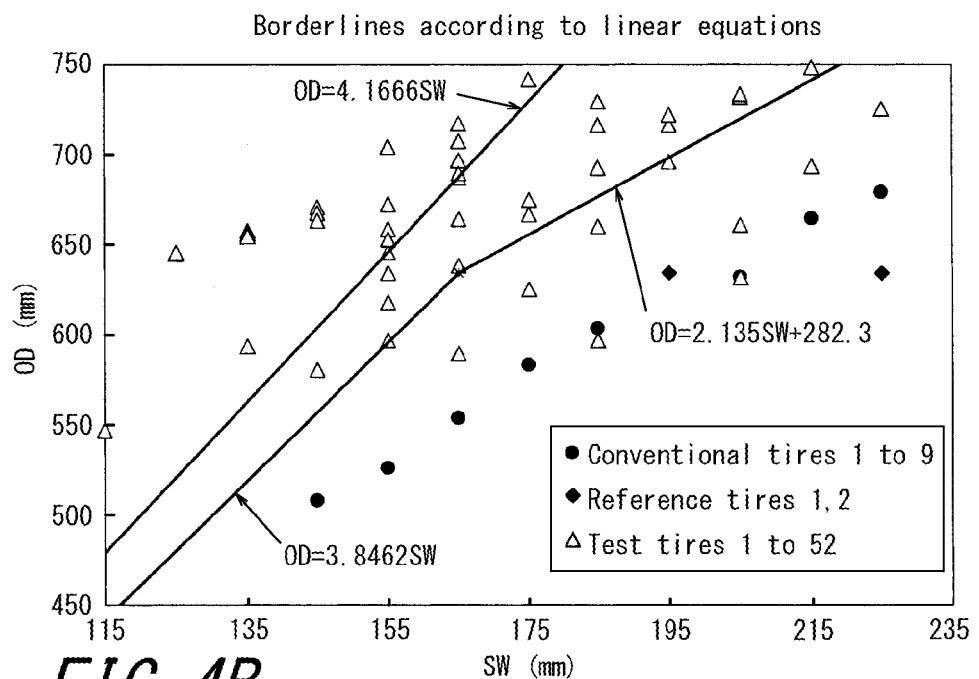
FIG. 4A is a graph showing relationships between SW and OD observed in the test tires of the present invention and the conventional test tires.

It has been revealed from the test results shown in Tables 2-1 and 2-2, FIG. 4A and FIG. 5 that a radial tire exhibits satisfactorily low air resistance value (Cd value) and rolling resistance value (RR value) in a compatible manner in a state where the tire is mounted on a vehicle, as compared with Reference tire 1 having tire size: 195/65R15 as the conventional tire, when the tire has a tire size satisfying the following formulae (which formulae will be referred to as "relationship formulae (1)" hereinafter), provided that SW and OD represent cross sectional width and outer diameter of the tire, respectively.

$SW/OD \leq 0.26$ when $SW < 165$ (mm); and $OD \geq 2.135 \times SW + 282.3$ when $SW \geq 165$ (mm)

FIG. 4A shows borderlines (borderlines according to linear equations) differentiating the test tires each exhibiting a good effect of reducing both rolling resistance value (RR value) and air resistance value (Cd value) thereof in a compatible manner from the test tires not causing the effect in a satisfactory manner. Specifically, one of the borderlines is constituted of a line expressing OD=(1/0.26)×SW when SW<165 (mm) and a line expressing OD=2.135×SW+282.3 when SW≥165 (mm).

Figure 4B:
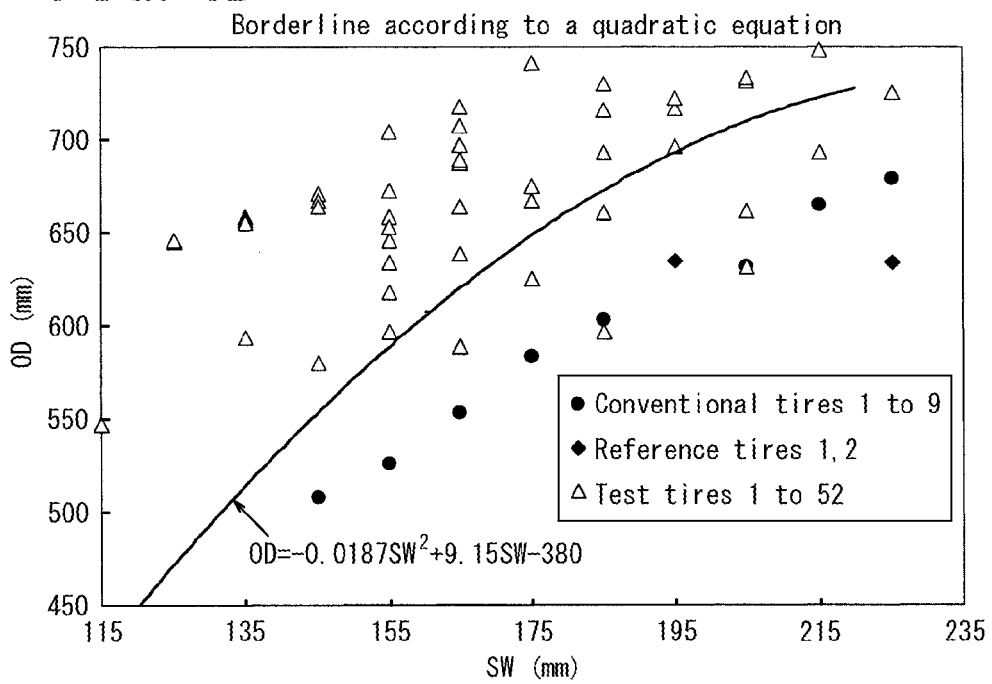
FIG. 4B is a graph showing a relationship between SW and OD observed in the test tires of the present invention and the conventional test tires.

It has been revealed from the test results shown in Tables 2-1 and 2-2, FIG. 4B and FIG. 5 that a radial tire exhibits satisfactorily low air resistance value (Cd value) and rolling resistance value (RR value) in a compatible manner in a state where the tire is mounted on a vehicle, as compared with Reference tire 1 having tire size: 195/65R15 as the conventional tire, when the tire, inflated at internal pressure≥250 kPa, has a tire size satisfying the following formula (which formula will be referred to as "relationship formula (2)" hereinafter), provided that SW and OD represent cross sectional width and outer diameter of the tire, respectively.

$OD \geq -0.0187 \times SW^2 + 9.15 \times SW - 380$

FIG. 4B shows a borderline (a borderline according to a quadratic equation) differentiating the test tires each exhibiting a good effect of reducing both rolling resistance value (RR value) and air resistance value (Cd value) thereof in a compatible manner from the test tires not causing the effect in a satisfactory manner. Specifically, the borderline is constituted of a quadratic curve expressing $OD=-0.0187\times SW^2+9.15\times SW-380$.

Further, the inventors of the present invention discovered that test tires 1 to 7 and 17, each satisfying $SW/OD\leq 0.24$, more reliably obtain the aforementioned good effect than other test tires, as shown in Tables 2-1, 2-2 and FIGS. 4A and 5.

Next, the following tests were carried out for each of test tires 1 to 18 in order to evaluate fuel efficiency and comfortability (degree of free space) of a vehicle on which the tire was mounted.

<In-Use Fuel Economy>
A test was carried out based on the JOC 8 test cycle prescribed by Ministry of Land, infrastructure, Transport and Tourism (MLIT) of Japan. The evaluation results are shown as index values relative to "100" of Reference tire 1. The larger index value represents the better fuel efficiency.

<Comfortability>
Each of the test tires was mounted on a vehicle having 1.7 m width and the resulting width of the rear trunk was measured. The evaluation results are shown as index values relative to "100" of Reference tire 1. The larger index value represents the better comfortability.

The test results thus obtained are shown in Table 3 below.

TABLE 3

| | Relationship formula (1) | Relationship formula (2) | In-use fuel economy | Comfortability |
|---|---|---|---|---|
| Test tire 1 | Satisfied | Satisfied | 117 | 105 |
| Test tire 2 | Satisfied | Satisfied | 119 | 104 |
| Test tire 3 | Satisfied | Satisfied | 105 | 105 |
| Test tire 4 | Satisfied | Satisfied | 107 | 105 |
| Test tire 5 | Satisfied | Satisfied | 112 | 104 |
| Test tire 6 | Satisfied | Satisfied | 114 | 104 |
| Test tire 7 | Satisfied | Satisfied | 116 | 104 |
| Test tire 8 | Not satisfied | Not satisfied | 100 | 104 |
| Test tire 9 | Not satisfied | Not satisfied | 101 | 102 |
| Test tire 10 | Not satisfied | Not satisfied | 106 | 101 |
| Test tire 11 | Not satisfied | Satisfied | 109 | 100 |
| Test tire 12 | Satisfied | Satisfied | 112 | 99 |
| Test tire 13 | Not satisfied | Not satisfied | 97 | 101 |
| Test tire 14 | Not satisfied | Not satisfied | 101 | 99 |
| Test tire 15 | Not satisfied | Not satisfied | 103 | 98 |
| Test tire 16 | Not satisfied | Not satisfied | 106 | 97 |
| Test tire 17 | Satisfied | Satisfied | 116 | 105 |
| Test tire 18 | Not satisfied | Not satisfied | 99 | 99 |
| Reference tire 1 | — | — | 100 | 100 |

It is understood from Table 3 that some of the test tires satisfying neither relationship formulae (1) nor relationship formula (2) (see FIGS. 4A and 4B) exhibited poorer results than Reference tire 1 in at least one of fuel efficiency and comfortability. In contrast, test tires 1 to 7, 12 and 17 (see FIGS. 4A and 4B) satisfying at least one of relationship formulae (1) and relationship formula (2) unanimously exhibited better results than Reference tire 1 in both fuel efficiency and comfortability.

The inventors of the present invention revealed from the findings described above that it is possible to reduce both air resistance value and rolling resistance value of a pneumatic radial tire in a state where the tire is mounted on a vehicle and also enhance fuel efficiency and comfortability of the vehicle by setting cross sectional width SW and outer diameter OD of the tire to satisfy the aforementioned relationship formulae (1) and/or relationship formula (2).

In this connection, the inventors of the present invention also realized that the tire satisfying the aforementioned relationship formulae (1) and/or relationship formula (2) exhibits increases in belt tension and ring rigidity thereof due to a relatively large outer diameter and experiences higher ground contact pressure in the vicinities of ground contact ends than in other portions thereof due to a relatively narrow width, thereby becoming sensitive to force inputted from a road surface to exhibit deteriorated low-noise properties, i.e. causing a problem which typically occurs in a tire having narrow width and large outer diameter. The inventors therefore keenly studied to solve the problem and discovered a tire structure which can successfully solve the problem. The tire structure for improving low-noise properties of a pneumatic radial tire for a passenger vehicle satisfying the aforementioned relationship formulae (1) and/or relationship formula (2) thus discovered will be described hereinafter.

Figure 6:
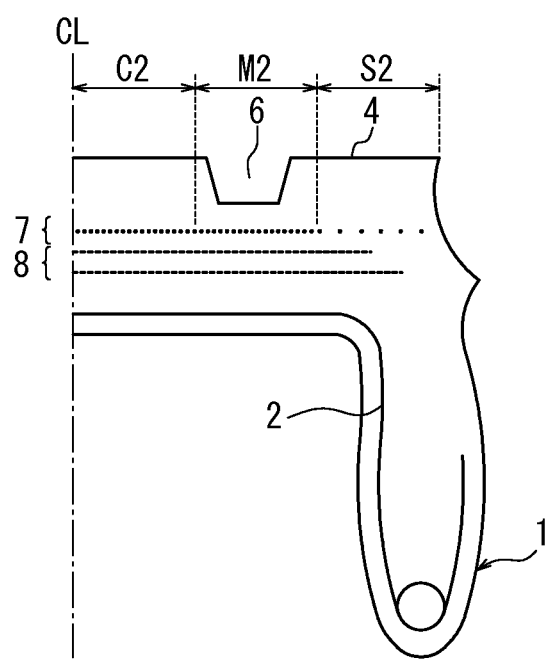
FIG. 6 is a schematic cross sectional view of a half portion of a radial tire according to one embodiment of the present invention.

FIG. 6 is a schematic cross sectional view, in the tire width direction, of a tire according to one embodiment of the present invention. FIG. 6 shows only one half portion with respect to the tire equatorial plane CL of the tire. The other half portion of the tire shares basically the same structure as the one half portion and therefore illustration thereof will be omitted.

FIG. 6 shows a tire in a state where the tire has been assembled with a rim and inflated at the air pressure under the maximum load respectively prescribed for each vehicle on which the tire is to be mounted.

The tire shown in FIG. 6 has a pair of bead portions 1, a carcass 2 provided to extend in a toroidal shape across the pair of bead portions 1, and a belt 8 constituted of a plurality of belt layers (two belt layers in FIG. 6) and a belt reinforcing layer 7 (a single layer in FIG. 6) and a tread 4 such that the belt 8, the belt reinforcing layer 7 and the tread 4 are provided on the outer side in the tire radial direction of the carcass 2 in this order.

In the tire of the present embodiment, the number of belt layers constituting the belt 8 preferably does not exceed two and the belt reinforcing layer 7 is constituted of at least one layer, preferably one or two layers (a single layer in the embodiment shown in FIG. 6).

The tire shown in FIG. 6 is different from the tire shown in FIG. 3 in that rigidity in the tire circumferential direction of the belt reinforcing layer 7 varies depending on positions in the tire width direction thereof in the former.

Figure 7:
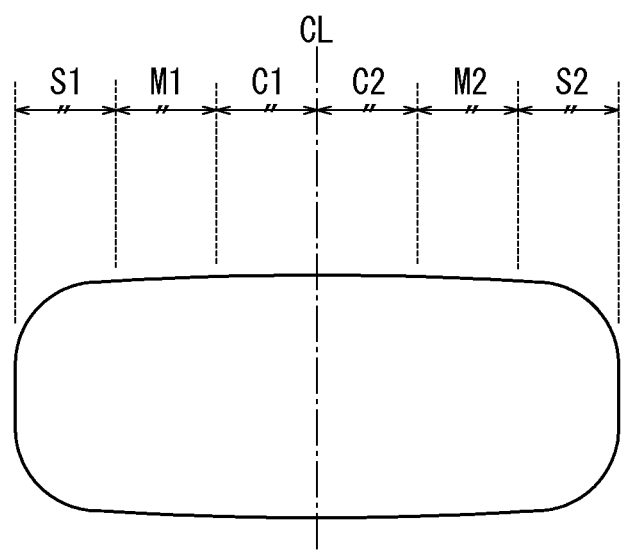
FIG. 7 is an explanatory diagram of tire-width-direction center portions C1, C2, tire-width-direction intermediate portions M1, M2, and tire-width-direction outer portions S1, S2.

Specifically, provided that each half portion in the tire width direction of a ground contact surface of the tire is divided in the tire width direction into three equal portions including a tire-width-direction center portion C1 (C2), a tire-width-direction intermediate portion M1 (M2) and a tire-width-direction outer portion S1 (S2) from the tire-width-direction center side, as shown in FIG. 7, rigidity in the tire circumferential direction of the belt reinforcing layer 7 in a region in the tire width direction thereof corresponding to the tire-width-direction outer side portion S1 (S2) (see FIG. 6) is lower than rigidity in the tire circumferential direction of the belt reinforcing layer 7 in a region in the tire width direction thereof corresponding to the tire-width-direction center portion C1 (C2) (see FIG. 6) in at least one of the half portions.

In this connection, for example, Young's modulus of a material for cords of the belt reinforcing layer in a region in the tire width direction thereof corresponding to the tirewidth-direction outer side portion S1 (S2) may be lower than that in a region in the tire width direction thereof corresponding to the tire-width-direction center portion C1 (C2). Alternatively, the cord implantation number of the belt reinforcing layer in a region in the tire width direction thereof corresponding to the tire-width-direction outer side portion S1 (S2) may be smaller than that in a region in the tire width direction thereof corresponding to the tire-width-direction center portion C1 (C2). Further alternatively, the number of the belt reinforcing layers in a region in the tire width direction thereof corresponding to the tire-width-direction outer side portion S1 (S2) may be smaller than that in a region in the tire width direction thereof corresponding to the tire-width-direction center portion C1 (C2). Yet further alternatively, the width in the tire width direction of the belt reinforcing layer in a region in the tire width direction thereof corresponding to the tire-width-direction outer side portion S1 (S2) may be narrower than that in a region in the tire width direction thereof corresponding to the tire-width-direction center portion C1 (C2). Yet further alternatively, any of two or more techniques described above may be used in combination such that rigidity in the tire circumferential direction of the belt reinforcing layer in a region in the tire width direction thereof corresponding to the tire-width-direction outer side portion is lower than rigidity in the tire circumferential direction of the belt reinforcing layer in a region in the tire width direction thereof corresponding to the tire-width-direction center portion.

An effect of the present invention will be described hereinafter.

According to the present invention, rigidity in the tire circumferential direction of the tread at a position in the tire width direction thereof corresponding to the tire-width-direction outer side portion S1, S2 is lower than rigidity in the tire circumferential direction of the tread at a position in the tire width direction thereof corresponding to the tire-width-direction center portion C1, C2. As a result, i) concentration of ground contact pressure on vicinities of ground contact ends is mitigated so that a distribution of the ground contact pressure in the tire width direction is made even and ii) ring rigidity of the tire decreases due to reduced rigidity in the tire circumferential direction in the tire-width-direction outer side portion S1, S2, thereby successfully reducing noise induced by force inputted from a road surface.

Further, occurrence of slips in the vicinities of ground contact ends of the tire is suppressed when lateral force is exerted thereon and thus cornering power of a vehicle enhances, as a result of the mitigation of concentration of ground contact pressure on vicinities of ground contact ends of the tire according to the present invention, although the enhancement of cornering power is not the primary object of the present invention. Yet further, wear resistance of the tire improves because occurrence of slips in the vicinities of ground contact ends of the tire is suppressed as described above and rotations per minute of the tire in running decrease due to an increase in outer diameter, i.e. an increase in ground contact length, of the tire.

Rigidity X1 in the tire circumferential direction of the belt reinforcing layer 7 in a region in the tire width direction thereof corresponding to the tire-width-direction outer side portion S1, S2 is preferably 75% of rigidity X2 in the tire circumferential direction of the belt reinforcing layer 7 in a region in the tire width direction thereof corresponding to the tire-width-direction center portion C1, C2 because then a distribution in the tire width direction of ground contact pressure can be effectively made even.

Further, rigidity X1 in the tire circumferential direction of the belt reinforcing layer 7 in a region in the tire width direction thereof corresponding to the tire-width-direction outer side portion S1, S2 is preferably ≥30% of rigidity X2 in the tire circumferential direction of the belt reinforcing layer 7 in a region in the tire width direction thereof corresponding to the tire-width-direction center portion C1, C2 because too low rigidities in the tire circumferential direction of belt end portions increase interlayer shearing strains at steel belt ends and decrease durability thereof.

Rigidity in the tire circumferential direction of the belt reinforcing layer in a region in the tire width direction thereof corresponding to the tire-width-direction intermediate portion may be either: equal to rigidity in the tire circumferential direction of the belt reinforcing layer in a region in the tire width direction thereof corresponding to the tire-width-direction center portion; or equal to rigidity in the tire circumferential direction of the belt reinforcing layer in a region in the tire width direction thereof corresponding to the tire-width-direction outer side portion; or around the intermediate value between these two rigidities.

The total (average) rigidity of the belt reinforcing layer in the regions thereof corresponding to the tire-width-direction intermediate portion M1 (M2) and the tire-width-direction outer side portion S1 (S2) in each half portion in the tire width direction of a ground contact surface of the tire is preferably ≤87.5% of the total (average) rigidity of the belt reinforcing layer in the regions thereof corresponding to the two tire-width-direction center portions C1, C2 in terms of making a distribution of ground contact pressure uniform.

In the present invention, the cord implantation number n (number of cords/50 mm) of the belt reinforcing layer 7 in a region in the tire width direction thereof corresponding to the tire-width-direction outer side portion S1, S2 is preferably 0.3 to 0.75 times as large as the cord implantation number n (number of cords/50 mm) of the belt reinforcing layer 7 in a region in the tire width direction thereof corresponding to the tire-width-direction center portion C1, C2.

The cord implantation number n of the belt reinforcing layer 7 in a region in the tire width direction thereof corresponding to the tire-width-direction outer side portion S1, S2 is preferably ≤0.75×the cord implantation number n of the belt reinforcing layer 7 in a region in the tire width direction thereof corresponding to the tire-width-direction center portion C1, C2 because then a distribution in the tire width direction of ground contact pressure can be effectively made even. Further, the former cord implantation number is preferably ≥0.3×the latter cord implantation number because then good durability of belt ends can be ensured.

Further, a ratio W/TW of a width W in the tire width direction of the belt reinforcing layer with respect to a tread width TW preferably satisfies the formula below in the present invention.

$$0.9 \leq W/TW \cdot 1.1$$

The belt reinforcing layer as a reinforcing member can adequately suppress deformation of the tread between a ground contact surface and the steel belt and thus well suppress an increase in rolling resistance of the tire when the ratio W/TW is ≥0.9. Further, it is possible to mitigate uneven distributions of ground contact pressure and shearing force in vicinities of the ground contact ends caused by excessive constraint in the tire circumferential direction by the belt reinforcing layer, so that good wear resistance is ensured, by setting the ratio W/TW to be ≤1.1.

Young's modulus of the cords for use in the belt reinforcing layer is preferably in the range of 3 GPa to 20 GPa in the present invention so that the cords as reinforcing members in the tire circumferential direction having Young's modulus corresponding to desired rigidity in the tire circumferential direction can be effectively disposed in the tire width direction.

The cords are preferably formed by using organic fibers or the like such as Kevlar® having fineness: 1000 to 1800 dtex so that a wide range of rigidity distribution can be realized by changing high rigidity cords and varying the implantation number thereof in the belt reinforcing layer.

The belt layer is preferably constituted of belt cords extending to be inclined at an angle≥45° with respect to the tire circumferential direction such that belt cords of one layer intersect belt cords of the other layer alternately. That is, the belt layer is preferably formed as a two-layered slant belt layer.

The belt layer preferably has the structure described above because the belt cords disposed to be inclined at a large angel with respect to the tire circumferential direction decrease out-of-plane bending rigidity in the tire circumferential direction of the tread, increases elongation in the tire circumferential direction of rubber when a ground contact surface of the tread is deformed and thus successfully suppresses a decrease in ground contact length of the tire, thereby well improving cornering power and partial wear resistance of the tire.

In this connection, the inclination angle of the belt cords of the belt layer with respect to the tire circumferential direction is preferably ≤75° in terms of avoiding an increase in rolling resistance and deterioration of wear resistance caused by a too long ground contact length in the tire circumferential direction.

The tire of the present invention preferably has air volume ≥15,000 cm$^3$ because a tire for a passenger vehicle must have an air volume ≥15,000 cm$^3$ in order to reliably have the minimum loading capacity essentially required of a passenger car running on public roads.

Examples

Test tires of Examples 1 to 13 and test tires of Comparative Examples 1, 2 were prepared and subjected to tests for evaluating various performances of the tires in order to confirm an effect of the present invention.

Each of the test tires has basically the same structure as the tire shown in FIG. 6. The belt reinforcing layer 7 of each test tire is a slant belt layer where belt cords of one layer intersect belt cords of the other layer alternately. An angle at which the belt cords of each belt cord layer are inclined with respect to the tire circumferential direction (the same angle value in the one layer and the other layer described above) is shown in Tables 4 and 5 for each of the test tires. Each test tire has the belt 8 made of steel cords.

Type of a material, Young's modulus and the cord implantation number of the belt reinforcing layer 7, as well as other detailed characteristics, of each of the test tires are also shown in Tables 4 and 5.

"Position corresponding to the center portion" represents a region in the tire width direction, of the belt reinforcing layer 7, corresponding to the tire-width-direction center portion C1, C2 and "Position corresponding to the outer side portion" represents a region in the tire width direction, of the belt reinforcing layer 7, corresponding to the tire-width-direction outer side portion S1, S2 in Tables 4 and 5.

Further, "Ratio of rigidity in the circumferential direction" represents a ratio of rigidity in the tire circumferential direction of the belt reinforcing layer in a region in the tire width direction thereof corresponding to the tire-width-direction outer side portion with respect to rigidity in the tire circumferential direction of the belt reinforcing layer in a region in the tire width direction thereof corresponding to the tire-width-direction center portion in Tables 4 and 5.

Yet further, "Belt cord inclination angle" represents an angle formed by the belt cords with respect to the tire circumferential direction in Tables 4 and 5.

TABLE 4

|  |  | Example 1 | Comp. Example 1 | Comp. Example 2 | Example 2 | Example 3 | Example 4 | Example 5 |
|---|---|---|---|---|---|---|---|---|
| Relationship formulae (1) |  | Satisfied | Satisfied | Satisfied | Satisfied | Satisfied | Satisfied | Satisfied |
| Relationship formula (2) |  | Satisfied | Satisfied | Satisfied | Satisfied | Satisfied | Satisfied | Satisfied |
| Tire size |  | 155/55R21 | 195/65R15 | 155/55R21 | 155/55R21 | 155/55R21 | 155/55R21 | 155/55R21 |
| SW/OD |  | 0.22 | 0.31 | 0.22 | 0.22 | 0.22 | 0.22 | 0.22 |
| Belt reinforcing layer (at a position corresponding to the central portion) | Material | Nylon | Nylon | Nylon | Nylon | Nylon | Kevlar | Kevlar |
|  | Young's modulus (GPa) | 3.4 | 3.4 | 3.4 | 3.4 | 3.4 | 11 | 11 |
|  | Cord implantation number (number/50 mm) | 50 | 50 | 50 | 50 | 50 | 50 | 50 |
| Belt reinforcing layer (at a position corresponding to the outer side portion) | Material | Nylon | Nylon | Nylon | Nylon | Nylon | Kevlar | Nylon |
|  | Young's modulus (GPa) | 3.4 | 3.4 | 3.4 | 3.4 | 3.4 | 11 | 3.4 |
|  | Cord implantation number (number/50 mm) | 40 | 40 | 50 | 37.5 | 38.5 | 40 | 50 |
| Rigidity in the circumferential direction (%) |  | 80 | 80 | 100 | 75 | 77 | 80 | 31 |
| Belt cord inclination angle |  | 28° | 28° | 28° | 28° | 28° | 28° | 28° |
| W/TW (%) |  | 100 | 100 | 100 | 100 | 100 | 100 | 100 |

TABLE 5

|  |  | Example 6 | Example 7 | Example 8 | Example 9 | Example 10 | Example 11 | Example 12 | Example 13 |
|---|---|---|---|---|---|---|---|---|---|
| Relationship formulae (1) | | Satisfied | Satisfied | Satisfied | Satisfied | Satisfied | Satisfied | Satisfied | Satisfied |
| Relationship formula (2) | | Satisfied | Satisfied | Satisfied | Satisfied | Satisfied | Satisfied | Satisfied | Satisfied |
| Tire size | | 155/55R21 | 155/55R21 | 155/55R21 | 155/55R21 | 155/55R21 | 155/55R21 | 155/60R17 | 185/50R20 |
| SW/OD | | 0.22 | 0.22 | 0.22 | 0.22 | 0.22 | 0.22 | 0.25 | 0.27 |
| Belt reinforcing layer (at a position corresponding to the central portion) | Material | Nylon | Nylon | Nylon | Nylon | Nylon | Nylon | Nylon | Nylon |
| | Young's modulus (GPa) | 3.4 | 3.4 | 3.4 | 3.4 | 3.4 | 3.4 | 3.4 | 3.4 |
| | Cord implantation number (number/50 mm) | 50 | 50 | 50 | 50 | 50 | 50 | 50 | 50 |
| Belt reinforcing layer (at a position corresponding to the outer side portion) | Material | Nylon | Nylon | Nylon | Nylon | Nylon | Nylon | Nylon | Nylon |
| | Young's modulus (GPa) | 3.4 | 3.4 | 3.4 | 3.4 | 3.4 | 3.4 | 3.4 | 3.4 |
| | Cord implantation number (number/50 mm) | 40 | 40 | 40 | 40 | 40 | 40 | 40 | 40 |
| Rigidity in the circumferential direction (%) | | 80 | 80 | 80 | 80 | 80 | 80 | 80 | 80 |
| Belt cord inclination angle | | 28° | 28° | 28° | 28° | 40° | 45° | 28° | 28° |
| W/TW (%) | | 90 | 88 | 112 | 110 | 100 | 100 | 100 | 100 |

The tests described below were carried out for each of the test tires to evaluate tire performances thereof.

<Low-Noise Properties>
Low-noise properties of each of the test tires were evaluated by: setting a sound pressure meter on the outer side of the driver seat (the window side in the interior of a vehicle); measuring sound pressure (dB) in the range of 0 to 2 kHz on a straight road as prescribed for road noise evaluation; and doing evaluation according to a magnitude of overall value of the sound pressure.
The low-noise properties of the test tires are expressed by index values relative to the low-noise property value "100" of Comparative Example 2 tire. The smaller index value represents the better low-noise properties.

<Cornering Power>
Cornering power of each test tire was measured by using a flat belt type tire testing apparatus for measuring the cornering characteristics thereof under the conditions of tire internal pressure: 220 kPa, load exerted on the tire: 3.5 kN and speed: 100 km/hour. The cornering power values thus measured were converted to index values relative to the cornering power value "100" of Comparative Example 2 tire for evaluation. The larger index value represents the larger and thus more preferable cornering power.

<Wear Resistance>
Wear resistance of each test tire was determined by: running the tire 30,000 km on a drum testing machine under the conditions of tire internal pressure: 220 kPa, load exerted on the tire: 3.5 kN and speed: 80 km/hour; and measuring a remaining groove depth after the running on the drum as a wear resistance value. The wear resistance values thus measured were converted to index values relative to the wear resistance value "100" of Comparative Example 2 tire for evaluation. The larger index value represents the better wear resistance.

<Partial Wear Resistance>
Partial wear resistance of each test tire was determined by: running the tire 30,000 km on a drum testing machine under the conditions of tire internal pressure: 220 kPa, load exerted on the tire: 3.5 kN and speed: 80 km/hour; and measuring difference in amount of wear between a tread center portion and a tread end portion after the running on the drum as a partial wear resistance value. The partial wear resistance values thus measured were converted to index values relative to the partial wear resistance value "100" of Comparative Example 2 tire for evaluation. The smaller index value represents the better partial wear resistance.

<In-Use Fuel Economy>
A fuel efficiency test was carried out as described above and the fuel efficiency values thus measured were expressed as index values relative to the fuel efficiency value "100" of Comp. Example 2 for evaluation. The larger index value represents the better fuel efficiency.

<Comfortability>
Comfortability or space availability in a vehicle was determined as described above and the comfortability values thus determined were expressed as index values relative to the comfortability value "100" of Comp. Example 2 for evaluation. The larger index value represents the better comfortability or space availability.

The respective evaluation results are shown in Tables 6 and 7.

TABLE 6

|  | Example 1 | Comp. Example 1 | Example 2 | Comp. Example 2 | Example 3 | Example 4 | Example 5 |
|---|---|---|---|---|---|---|---|
| Low-noise properties | 85 | 94 | 100 | 80 | 83 | 90 | 87 |
| Cornering power | 103 | 95 | 100 | 107 | 105 | 107 | 110 |
| Wear resistance | 103 | 98 | 100 | 105 | 104 | 106 | 110 |
| Partial wear resistance | 96 | 97 | 100 | 93 | 95 | 95 | 90 |
| In-use fuel economy | 107 | 99 | 100 | 104 | 105 | 110 | 108 |

TABLE 7

|  | Example 6 | Example 7 | Example 8 | Example 9 | Example 10 | Example 11 | Example 12 | Example 13 |
|---|---|---|---|---|---|---|---|---|
| Low-noise properties | 83 | 84 | 86 | 87 | 90 | 88 | 89 | 90 |
| Cornering power | 106 | 105 | 104 | 104 | 110 | 112 | 102 | 102 |
| Wear resistance | 105 | 105 | 102 | 104 | 106 | 108 | 102 | 102 |
| Partial wear resistance | 94 | 94 | 97 | 98 | 93 | 90 | 98 | 97 |
| In-use fuel economy | 104 | 102 | 108 | 109 | 108 | 110 | 104 | 103 |

It is understood from Tables 6 and 7 that the tires of Examples 1 to 13 satisfying relationship formulae (1) and/or relationship formula (2) and having rigidity in the tire circumferential direction, optimized depending on a position in the tire width direction, of the belt reinforcing layer unanimously exhibit good performances in each of low-noise properties, cornering power, wear resistance, partial wear resistance and fuel efficiency and can ensure satisfactory comfortability or space availability, as well.

Further, it is understood from comparison of Example 2 with Example 3 shown in Table 6 that the tire of Example 2 in which the ratio of rigidity in the tire circumferential direction of the belt reinforcing layer in the tire-width-direction outer side portion thereof with respect to that in the tire-width-direction center portion thereof has been optimized by setting preferable cord implantation numbers of the belt reinforcing layer in the tire-width-direction center portion and the tire-width-direction outer side portion thereof, respectively, exhibits better low-noise properties, cornering power, wear resistance and partial wear resistance than the tire of Example 3.

Yet further, it is understood from Table 7 that the tire of Example 6 having a more preferable ratio T/TW exhibits better fuel efficiency than the tire of Example 7 and that the tire of Example 9 having a more preferable ratio T/TW exhibits better wear resistance than the tire of Example 8. Yet further, it is understood from Table 7 that the tire of Example 11 having a more preferable angle between the belt cords and the tire circumferential direction exhibits better cornering power and wear resistance than the tire of Example 10.

REFERENCE SIGNS LIST

1 Bead portion
2 Carcass
3 Belt layer
4 Tread
5 Belt reinforcing layer
6 Groove
7 Belt reinforcing layer
8 Belt
C1, C2 Tire-width-direction center portion
M1, M2 Tire-width-direction intermediate portion
S1, S2 Tire-width-direction outer side portion

The invention claimed is:

1. A tire-rim assembly formed by assembling a pair of bead portions of a passenger vehicle pneumatic radial tire, having a carcass constituted of plies as radially-disposed carcass cords and provided in a toroidal shape across the pair of bead portions, a belt constituted of one or two belt layers, and at least one belt reinforcing layer as a rubber-coated cord layer extending in a tire circumferential direction, the belt and the belt reinforcing layer being provided on the outer side in a tire radial direction of the carcass, characterized in that:
provided that SW and OD represent a cross sectional width and an outer diameter of the tire, respectively, SW≥145 (mm),
SW/OD≤0.26 when 145 (mm)≤SW<165 (mm) and
SW and OD satisfy a formula shown below when SW≥165 (mm)

$$OD \geq 2.135 \times SW + 282.3;$$

provided that each half portion in a tire width direction of a ground contact surface of the tire is divided in the tire width direction into three equal portions including a tire-width-direction center portion, a tire-width-direction intermediate portion and a tire-width-direction outer portion from a tire-width-direction center side, rigidity in the tire circumferential direction of the belt reinforcing layer in a region in the tire width direction thereof corresponding to a tire-width-direction outer side portion is lower than rigidity in the tire circumferential direction of the belt reinforcing layer in a region in the tire width direction thereof corresponding to the tire-width-direction center portion;
an aspect ratio of the passenger vehicle pneumatic radial tire is greater than or equal to 50 and less than 70,
provided that D represents a rim diameter of the tire, SW and D satisfy the following formula:

$$0.30 < SW/D \leq 0.52,$$

the tire-rim assembly is filled only with gas,
the rim diameter of the tire is greater than or equal to 431.8 mm and less than or equal to 558.8 mm, and
the outer diameter of the tire is greater than or equal to 638.7 mm and less than or equal to 751.3 mm.

2. The tire-rim assembly of claim 1, wherein SW/OD≤0.24.

3. The tire-rim assembly of claim 1, wherein rigidity in the tire circumferential direction of the belt reinforcing layer in a region in the tire width direction thereof corresponding to the tire-width-direction outer side portion is ≤75% of rigidity in the tire circumferential direction of the belt reinforcing layer in a region in the tire width direction thereof corresponding to the tire-width-direction center portion.

4. The tire-rim assembly of claim 1, wherein a cord implantation number n of the belt reinforcing layer in a region in the tire width direction thereof corresponding to the tire-width-direction outer side portion is ≤0.75×a cord implantation number n of the belt reinforcing layer in a region in the tire width direction thereof corresponding to the tire-width-direction center portion.

5. The tire-rim assembly of claim 1, wherein a ratio W/TW of a width W in the tire width direction of the belt reinforcing layer with respect to a tread width TW satisfies the formula $0.9 \leq W/TW \leq 1.1$.

6. The tire-rim assembly of claim 1, wherein the belt is constituted of the two belt layers and each of the two belt layers is constituted of belt cords extending to be inclined at an angle $\geq 45°$ with respect to the tire circumferential direction such that the belt cords of one layer intersect the belt cords of the other layer to form a multilayered slant belt.

7. The tire-rim assembly of claim 1, wherein the rigidity in the tire circumferential direction of the belt reinforcing layer in the region thereof corresponding to the tire-width-direction center portion of the ground contact surface is constant across the region.

8. The tire-rim assembly of claim 1, wherein Young's modulus of a material for cords of the belt reinforcing layer in the region in the tire width direction thereof corresponding to the tire-width-direction outer side portion is lower than that in the region in the tire width direction thereof corresponding to the tire-width-direction center portion.

9. The tire-rim assembly of claim 1, wherein a cord implantation number of the belt reinforcing layer in the region in the tire width direction thereof corresponding to the tire-width-direction outer side portion is smaller than a cord implantation number of the belt reinforcing layer in the region in the tire width direction thereof corresponding to the tire-width-direction center portion.

10. The tire-rim assembly of claim 1, wherein a width in the tire width direction of the belt reinforcing layer in the region in the tire width direction thereof corresponding to the tire-width-direction outer side portion is narrower than that in the region in the tire width direction thereof corresponding to the tire-width-direction center portion.

11. The tire-rim assembly of claim 1, wherein the aspect ratio of the passenger vehicle pneumatic radial tire is greater than or equal to 55 and less than 70.

12. A tire-rim assembly formed by assembling a pair of bead portions of a passenger vehicle pneumatic radial tire, having a carcass constituted of plies as radially-disposed carcass cords and provided in a toroidal shape across the pair of bead portions, a belt constituted of one or two belt layers, and at least one belt reinforcing layer as a rubber-coated cord layer extending in a tire circumferential direction, the belt and the belt reinforcing layer being provided on the outer side in a tire radial direction of the carcass, characterized in that:
provided that SW and OD represent a cross sectional width and an outer diameter of the tire, respectively, $SW \geq 145$ (mm),
$SW/OD \leq 0.26$ when 145 (mm)$\leq SW < 165$ (mm) and
SW and OD satisfy a formula shown below when $SW \geq 165$ (mm)

$$OD \geq 2.135 \times SW + 282.3;$$

provided that each half portion in a tire width direction of a ground contact surface of the tire is divided in the tire width direction into three equal portions including a tire-width-direction center portion, a tire-width-direction intermediate portion and a tire-width-direction outer portion from a tire-width-direction center side, rigidity in the tire circumferential direction of the belt reinforcing layer in a region in the tire width direction thereof corresponding to a tire-width-direction outer side portion is lower than rigidity in the tire circumferential direction of the belt reinforcing layer in a region in the tire width direction thereof corresponding to the tire-width-direction center portion; and
an aspect ratio of the passenger vehicle pneumatic radial tire is greater than or equal to 50 and less than 70,
wherein $SW \geq 165$ (mm) and SW and OD satisfy the following formulae:

$$2.135 \times SW + 282.3 \leq OD < (1/0.26) \times SW,$$

the tire-rim assembly is filled only with gas,
the rim diameter of the tire is greater than or equal to 431.8 mm and less than or equal to 558.8 mm, and
the outer diameter of the tire is greater than or equal to 638.7 mm and less than or equal to 751.3 mm.

13. A tire-rim assembly formed by assembling a pair of bead portions of a passenger vehicle pneumatic radial tire, having a carcass constituted of plies as radially-disposed carcass cords and provided in a toroidal shape across the pair of bead portions, a belt constituted of one or two belt layers, and at least one belt reinforcing layer as a rubber-coated cord layer extending in a tire circumferential direction, the belt and the belt reinforcing layer being provided on the outer side in a tire radial direction of the carcass, characterized in that:
SW and OD satisfy a first condition shown below:
$SW/OD \leq 0.26$; and 145 (mm)$\leq SW < 165$ (mm), or
SW and OD satisfy a second condition shown below:
$SW \geq 165$ (mm); and $OD \geq 2.135 \times SW + 282.3$,
where SW and OD represent a cross sectional width and an outer diameter of the tire, respectively,
provided that each half portion in a tire width direction of a ground contact surface of the tire is divided in the tire width direction into three equal portions including a tire-width-direction center portion, a tire-width-direction intermediate portion and a tire-width-direction outer portion from a tire-width-direction center side, rigidity in the tire circumferential direction of the belt reinforcing layer in a region in the tire width direction thereof corresponding to a tire-width-direction outer side portion is different from rigidity in the tire circumferential direction of the belt reinforcing layer in a region in the tire width direction thereof corresponding to the tire-width-direction center portion,
an aspect ratio of the passenger vehicle pneumatic radial tire is greater than or equal to 50 and less than 70,
provided that D represents a rim diameter of the tire, SW and D satisfy the following formula $$0.30 < SW/D \leq 0.52,$$

the tire-rim assembly is filled only with gas,
the rim diameter of the tire is greater than or equal to 431.8 mm and less than or equal to 558.8 mm, and
the outer diameter of the tire is greater than or equal to 638.7 mm and less than or equal to 751.3 mm.

14. The tire-rim assembly of claim 13, wherein $SW/OD \leq 0.24$.

15. The tire-rim assembly of claim 13, wherein Young's modulus of a material for cords of the belt reinforcing layer in the region in the tire width direction thereof corresponding to the tire-width-direction outer side portion is lower than that in the region in the tire width direction thereof corresponding to the tire-width-direction center portion.

16. The tire-rim assembly of claim 13, wherein a cord implantation number of the belt reinforcing layer in the region in the tire width direction thereof corresponding to the tire-width-direction outer side portion is smaller than a cord implantation number of the belt reinforcing layer in the region in the tire width direction thereof corresponding to the tire-width-direction center portion.

17. The tire-rim assembly of claim 13, wherein a width in the tire width direction of the belt reinforcing layer in the region in the tire width direction thereof corresponding to the tire-width-direction outer side portion is narrower than that in the region in the tire width direction thereof corresponding to the tire-width-direction center portion.

18. The tire-rim assembly of claim 13, wherein the rigidity in the tire circumferential direction of the belt reinforcing layer in the region thereof corresponding to the tire-width-direction center portion of the ground contact surface is constant across the region.

19. The tire-rim assembly of claim 13, wherein SW 165 (mm) and SW and OD satisfy the following formulae:

$$2.135 \times SW + 282.3 \leq OD < (1/0.26) \times SW, \text{ and}$$

the belt layer is constituted of the two belt layers and each of the two belt layers is constituted of belt cords extending to be inclined at an angle in the range of $\geq 20°$ and $\leq 45°$ with respect to the tire circumferential direction such that the belt cords of one layer intersect the belt cords of the other layer to form a multilayered slant belt.

20. The tire-rim assembly of claim 13, wherein a ratio W/TW of a width W in the tire width direction of the belt reinforcing layer with respect to a tread width TW satisfies the formula $0.9 \leq W/TW \leq 1.1$.

21. The tire-rim assembly of claim 13, wherein the belt layer is constituted of the two belt layers and each of the two belt layers is constituted of belt cords extending to be inclined at an angle in the range of $\geq 20°$ and $\leq 45°$ with respect to the tire circumferential direction such that the belt cords of one layer intersect the belt cords of the other layer to form a multilayered slant belt.

22. The tire-rim assembly of claim 13, wherein the aspect ratio of the passenger vehicle pneumatic radial tire is greater than or equal to 55 and less than 70.

* * * * *